May 20, 1958     E. C. DORRIS     2,835,509
TRACTOR-TRAILER SAFETY COUPLING
Filed June 17, 1957

INVENTOR
Edwin C. Dorris

BY *Ahley & Ahley*

ATTORNEYS

United States Patent Office 2,835,509
Patented May 20, 1958

2,835,509

TRACTOR-TRAILER SAFETY COUPLING

Edwin C. Dorris, San Angelo, Tex.

Application June 17, 1957, Serial No. 665,951

7 Claims. (Cl. 280—432)

This invention relates to new and useful improvements in tractor-trailer couplings.

One object of the invention is to provide an improved tractor-trailer coupling which is so constructed that the the trailer is prevented from striking the cab of the tractor when said trailer overrides said tractor due to collision or other sudden stopping which shears the king pin of the coupling.

Another object of the inventon is to provide an improved coupling, of the character described, having a king pin and fifth wheel of such construction that the trailer is directed laterally of the tractor in the event that the king pin fractures whereby damaging of the tractor cab and injuring of the operator by overriding of said trailer are substantially eliminated.

A particular object of the invention is to provide an improved coupling, of the character described, wherein the king pin includes a reduced or frangible portion for connection with the slot of the fifth wheel and an enlarged portion engaging in a groove extending laterally from the slot whereby said king pin is directed laterally of said fifth wheel upon shearing of the reduced or frangible portion of said pin.

An important object of the invetnion is to provide an improved coupling, of the character described, wherein the groove is curved toward one side of the fifth wheel and has undercut side walls for receiving an enlargement on the king pin to maintain said king pin in engagement with said groove.

A construction designed to carry out the invention will be hereinafter described, together with other features of the invention.

Figure 1:
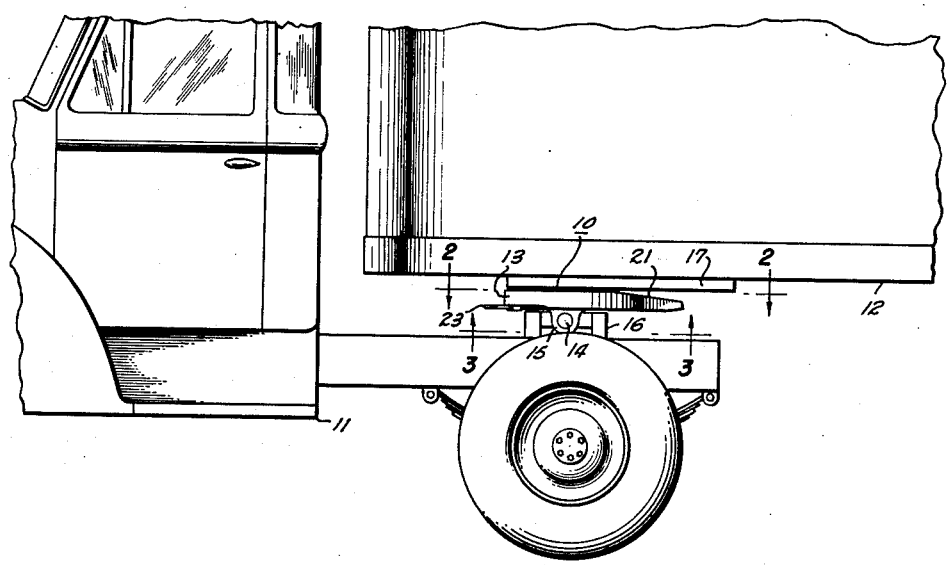
Figures 2, 3:
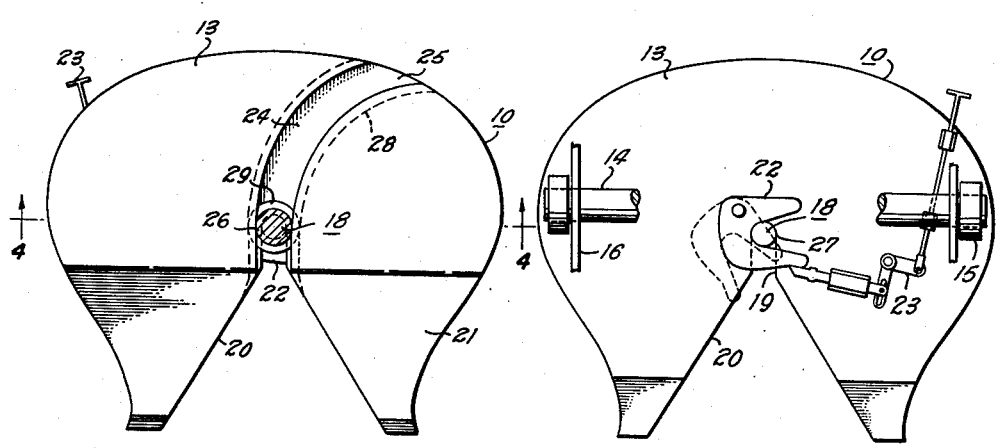
Figure 4:
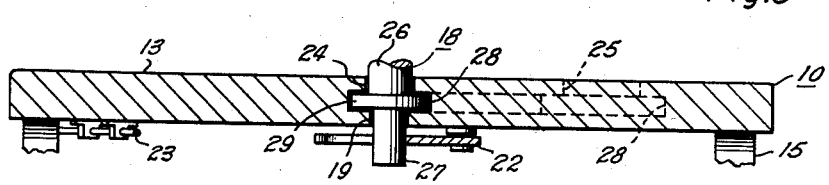

The invention will be more readily understood from a reading of the following specification and by reference to the accompanying drawing, wherein an example of the invention is shown, and wherein:

Fig. 1 is a side elevational view of a tractor and trailer having a couling constructed in accordance with the invention, Fig. 2 is an enlarged, horizontal, cross-sectional view, taken on the line 2—2 of Fig. 1, showing the king pin locked in the slot of the fifth wheel, Fig. 3 is an enlarged, horizontal, cross-sectional view, taken on the line 3—3 of Fig. 1, showing the underside of the fifth wheel, and Fig. 4 is an enlarged, transverse, vertical, sectional view, taken on the line 4—4 of Fig. 2.

In the drawing, the numeral 10 designates a coupling for a conventional tractor 11 and trailer 12 which includes a fifth wheel 13 rockably mounted on the rear end of the tractor by a horizontal, transverse pivot pin 14. Suitable lugs 15 depend from the underside of the fifth wheel 13 and brackets 16 upstand from the tractor 11 for receiving the pin 14 and pivotally connecting said wheel to said tractor. The wheel is of the usual contour and is adapted to be engaged by an overlying, horizontal bearing member or plate 17 secured to the underside of the trailer 12. An upright, cylindrical king pin 18 depends from the bearing plate 17 for engaging in a slot 19 formed in the rear margin of the wheel 13 and extending longitudinally of the tractor and wheel (Figs. 3 and 4). In order to facilitate engagement of the king pin 18 with the slot 19, the rear or outer portion of said slot is enlarged and has outwardly diverging or flaring side walls 20. Also, the wheel 13 has a rearwardly sloping face 21 at its rear portion so that the bearing plate may be more readily engaged with said wheel. A latch 22, which is adapted to be actuated by a suitable locking mechanism 23, is pivotally mounted on the underside of the wheel for locking the king pin in the slot (Fig. 3).

In order to direct the trailer 12 laterally of the tractor 11 and prevent said trailer from striking the cab of said tractor in the event that said trailer overrides said tractor due to collision or other sudden stopping which shears the king pin 18, a groove 24 is formed in the upper surface of the fifth wheel 13 for receiving the upper portion of said king pin. As shown in Figs. 2 and 4, the groove 24 has its rear end portion in overlying, communicating alinement with the inner end portion of the slot 19 and is curved forwardly and laterally therefrom with its opposite or front end 25 terminating at the front portion of the right-hand margin of the wheel. The groove is of greater width than the slot and the upper or inner portion 26 of the king pin is of greater diameter than the lower portion thereof. As shown by the numeral 27 in Figs. 3 and 4, the lower or outer portion of the king pin is of reduced diameter so as to be more readily frangible or shearable than the larger upper portion 26. For confining the upper portion of the pin in engagement with the groove after shearing of its reduced portion 27, the side walls of said groove are recessed or undercut to provide coextensive, guide channels 28. A radial enlargement or flange 29 is formed on the king pin between its larger and reduced portions for engagement in the guide channels 28 of the groove.

Due to the foregoing construction, the larger, upper portion 26 of the king pin is maintained in engagement with the groove 24 throughout its length upon shearing of the reduced, lower portion 27 due to collision or other sudden stopping which permits the trailer 12 to override the tractor 11. Since the fractured king pin is maintained in engagement with the groove, the curvature of said groove directs said pin laterally of the fifth wheel 13. As a result, the front end of the trailer moves laterally of the tractor and is prevented from striking and damaging its cab and injuring the operator upon overriding of said trailer. It is noted that the curvature of the groove 24 is sufficient to impart the desired lateral movement to the front end of the trailer and that the lower or outer portion 27 of the king pin may be rendered frangible in any suitable manner. Although the king pin is usually carried by the trailer, the improved safety coupling may be applied to tractor-trailer couplings wherein the fifth wheel and king pin are reversed.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A tractor-trailer coupling including a fifth wheel having a slot, and a king pin adapted to be locked in the slot, the fifth wheel having a groove alined and communicating with said slot for receiving the king pin, the groove extending laterally from the inner end of said slot, said king pin having a frangible portion engaged in said slot whereby said pin is directed laterally by said groove upon shearing of the frangible portion due to inward movement of said pin relative to said slot.

2. A tractor-trailer coupling as set forth in claim 1 wherein the king pin has a radial enlargement, the groove having undercut side walls for receiving the enlargement to maintain said king pin in engagement with said groove.

3. A tractor-trailer coupling as set forth in claim 1 wherein the groove is curved and extends to one of the lateral margins of the fifth wheel.

4. A tractor-trailer coupling including a fifth wheel mounted on the tractor and having a slot in is rear margin exending longitudinally of the tractor, and an upright king pin depending from the trailer and adapted to be locked in the slot, the fifth wheel having a groove overlying and communicating with said slot for receiving the upper portion of the king pin, the groove extending forwardly and laterally from the inner end of said slot to one of the lateral margins of said fifth wheel, said king pin having a frangible lower portion engaged in said slot whereby the trailer is directed laterally of the tractor by the engagement of the upper portion of said pin in said groove upon shearing of the lower portion of said pin due to forward movement of the trailer relative to the tractor.

5. A tractor-trailer coupling as set forth in claim 4 including coacting means for maintaining the upper portion of the king pin in engagement with the groove throughout its length.

6. A tractor-trailer coupling as set forth in claim 4 including a radial flange on the upper portion of the king pin, the groove having recessed side walls to provide guide channels for receiving the flange to maintain said pin in engagement with said groove throughout its length.

7. A tractor-trailer coupling as set forth in claim 6 wherein the groove is curved toward the right-hand margin of the fifth wheel.

References Cited in the file of this patent

UNITED STATES PATENTS

| | | |
|---|---|---|
| 2,438,346 | Mooney | Mar. 23, 1948 |
| 2,450,201 | Logan | Sept. 28, 1948 |
| 2,462,211 | Moore | Feb. 22, 1949 |
| 2,652,262 | Sherry | Sept. 15, 1953 |